United States Patent [19]

Feei

[11] Patent Number: 5,220,678
[45] Date of Patent: Jun. 15, 1993

[54] METHOD AND APPARATUS FOR ADJUSTING THE POWER OF A TRANSMITTER

[75] Inventor: Loh J. Feei, Penang, Malaysia
[73] Assignee: Motorola, Inc., Schaumburg, Ill.
[21] Appl. No.: 743,648
[22] Filed: Aug. 12, 1991
[51] Int. Cl.⁵ .............................................. H04B 1/00
[52] U.S. Cl. ...................... 455/69; 455/127; 455/343
[58] Field of Search ............ 455/69, 127, 88, 126, 455/54.1, 54.2, 38.3

[56] References Cited

U.S. PATENT DOCUMENTS

| | | | |
|---|---|---|---|
| 4,495,648 | 1/1985 | Giger | 455/343 |
| 4,613,990 | 8/1986 | Halpern | 455/69 |
| 5,003,619 | 3/1991 | Morris et al. | 455/69 |

FOREIGN PATENT DOCUMENTS 4001810  1/1990  Fed. Rep. of Germany ...... 455/343

Primary Examiner—Reinhard J. Eisenzopf
Assistant Examiner—Almaz Wolou
Attorney, Agent, or Firm—Pablo Meles; Lesley Ann Rhyne

[57] ABSTRACT

A subscriber unit (200) adjusts transmitter power during a subscriber call by transmitting a first message at a first power level (10) that decreases (80) to a second minimum required power level (60) within a predetermined duration to a second subscriber unit (300), receiving a reply message from the second subscriber unit, the reply message including a code representing a desired transmitting signal strength (20) of the first subscriber unit as determined by the second subscriber unit based on the predetermined duration (70) and the second minimum required power level (20), determining a value representing the desired transmitting signal strength of the first subscriber unit of the reply message, adjusting the power level based on the value representing the desired transmitting signal strength, and then transmitting a second message at the desired transmitting signal strength to the second subscriber.

20 Claims, 3 Drawing Sheets

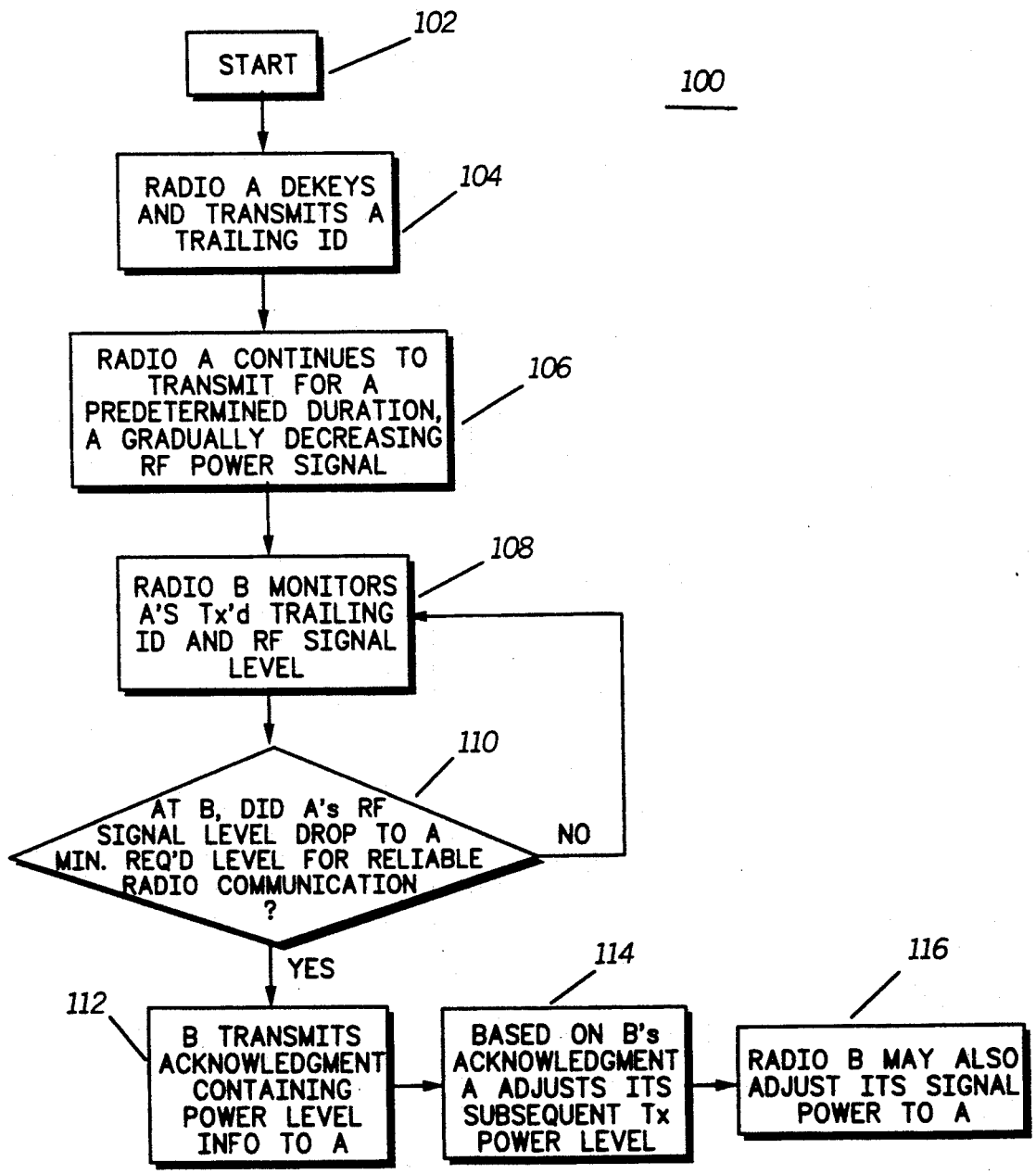

METHOD AND APPARATUS FOR ADJUSTING THE POWER OF A TRANSMITTER

TECHNICAL FIELD

This invention relates generally to two-way radio frequency communication systems, and more specifically to variable power transceivers operating within such systems, and is particularly directed toward transmitter power control during transmissions between two or more variable power transceivers.

BACKGROUND ART

Numerous techniques exist to vary the power of a transmitter or transceiver operating within a communication system. For example, it is known that battery powered transceivers (subscriber units) may be instructed by a base unit (or repeater) to increase or decrease their transmitter power. Accordingly, upon receipt of an appropriate command code, the battery powered transceiver adjusts its transmitter power (up or down) by a predetermined amount. In this way, the operational life of the battery power subscriber units may be increased by permitting transmissions at reduced power when the battery powered subscriber units are near the base unit (or repeater). See U.S. Pat. No. 5,003,610 by Morris Et. Al., hereby incorporated by reference. In many instances though, to ensure reliable communications between portables or between a portable and a base, the radio is transmitting at maximum RF power. This drains current and shortens battery life. One way to resolve this problem would be to increase battery capacity, but that would negatively impact the cost, weight and size of the overall radio-battery combination. Furthermore, transmitting at maximum power would cause undue interference with other radios in a nearby system.

In many situations, however, the major share of communication activity takes place directly between subscriber units (i.e., subscriber-to-subscriber), and not subscriber-to-base. Thus, the energy saving advantage is lost at a time when it is most critical to insure maximized operational transceiver life. Mode slaved or user selectable RF power does not resolve the problem fully. In case of user selectable power, it relies on user intelligence to decide which power level to use for communication. Thus, a need exists for an RF power tuning device which resolves the problems discussed above.

SUMMARY OF THE INVENTION

A subscriber unit capable of adjusting transmitter power during a subscriber call comprises a means for transmitting a first message at a first power level that decreases to a second minimum required power level within a predetermined duration to a second subscriber unit, means for receiving a reply message from the second subscriber unit, the reply message including a code representing a desired transmitting signal strength of the first subscriber unit as determined by the second subscriber unit, means for determining a value representing the desired transmitting signal strength of the first subscriber unit of the reply message, means for adjusting the power level based on the value representing the desired transmitting signal strength, and means for transmitting a second message at the desired transmitting signal strength to the second subscriber.

BRIEF DESCRIPTION OF THE DRAWINGS

FIG. 2 is a flow diagram illustrating the operational steps performed by subscriber units or radios in accordance with the present invention.

DETAILED DESCRIPTION OF THE PREFERRED EMBODIMENT

Figure 1A:
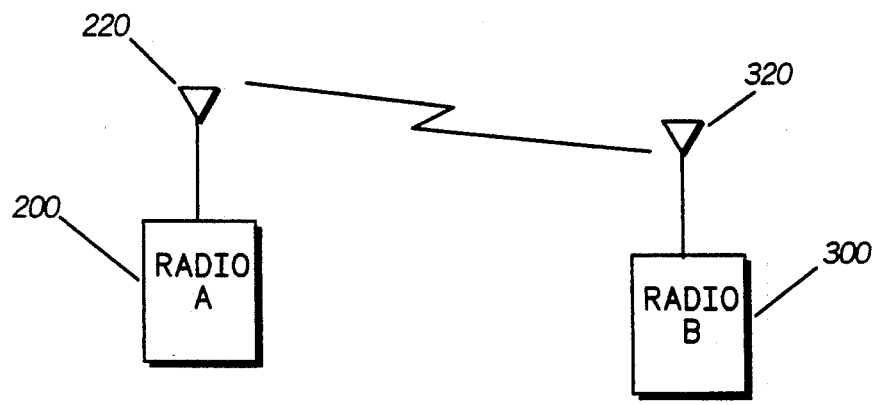
FIG. 1A is a block diagram of a communication system in accordance with the present invention.

Referring to FIG. 1A, there is shown a block diagram of a communication system in accordance with the present invention preferably comprising a first subscriber unit or radio 200 having an antenna 220 and a second subscriber unit or radio 300 having an antenna 320. Radios 200 and 300 are preferably portable units, but mobile units, or control stations could be used as well. As used herein, a portable unit is designed to be carried on the person, a mobile unit is designed to be installed in vehicles, and control stations are a permanent or semi-permanent installation in a building or other fixed location. The advantages of the present invention are primarily exploitable by portable units, which typically are battery powered hand-held transceivers.

Figure 1B:
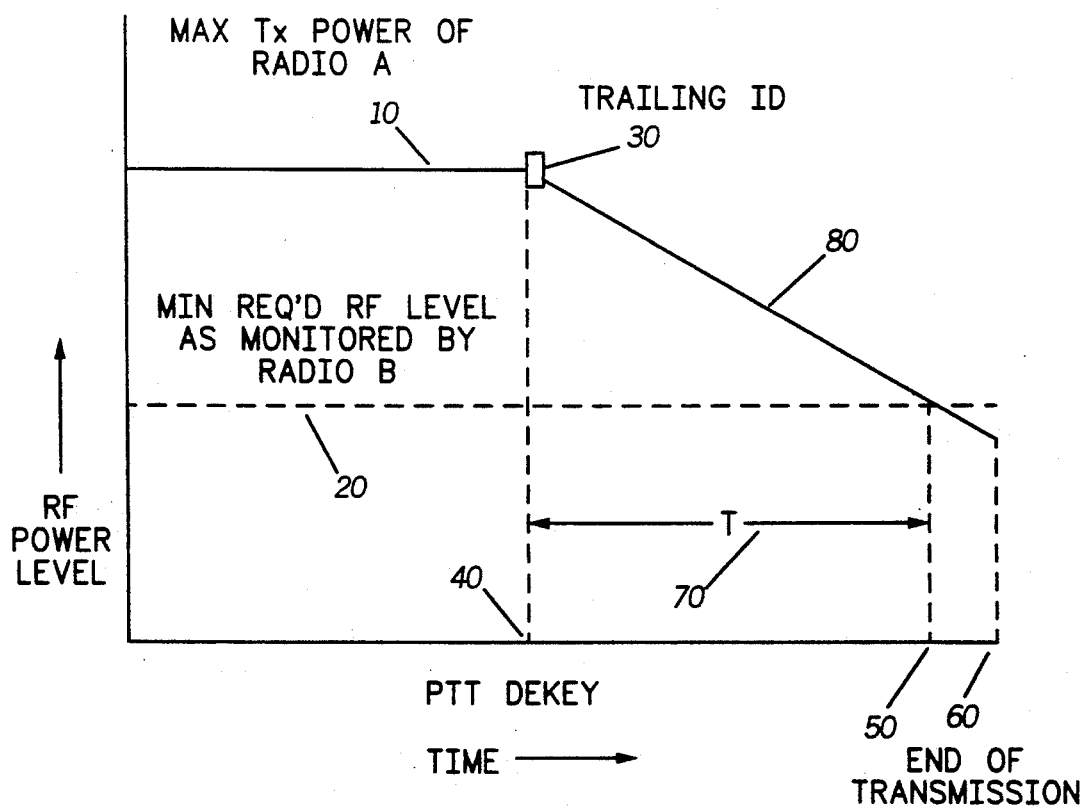
FIG. 1B is a graph of RF power level versus time in accordance with the present invention.

Referring to FIG. 1B, there is shown a graph of RF power level versus time in accordance with the present invention. When a transmitter in accordance with the present invention transmits, it would initially transmit at maximum power 10. When a user dekeys (40), typically by releasing a Push-to-talk (PTT) switch, the transmitter preferably transmits out an trailing (ID) Identification 30 to identify the transmitting radio (200) and to signify the end of a transmission. After the transmission of the trailing ID 30, the radio 200 continues to transmit for a certain pre-determined duration (60), but with a gradually decreasing RF power 80. The rate of RF power decrement must be fixed, but does not necessarily have to be linear. A second radio (300) monitors the transmission of the first radio (200). Upon receiving the trailing ID 30 and subsequently by monitoring the gradually decreasing RF signal after the trailing ID 30, radio 300 would be able to determine when the RF signal level drops to a minimum required level (20) for reliable radio communications. After radio 200 stops transmitting, radio 300 will preferably transmit an acknowledgment or reply message containing the necessary information back to radio 200. The necessary information preferably contains the time T (70) between the trailing ID (30) to the point (50) where the RF signal drops to an unacceptable level for reception. Radio 200 would need to calculate the required RF transmission power based on this information. Optionally, radio 300 could explicitly specify the transmission power of radio 200 for subsequent transmissions assuming that radio 300 knows the maximum power level of the initial radio 200 transmission (10) and the slope of the RF power reduction (80) of radio 200. Based on this acknowledgment or reply message from radio 300, radio 200 preferably adjusts its subsequent transmission power accordingly. Radio 300 could also adjust its transmission power to radio 200 if so required based on that single radio transaction. This methods provides one of many algorithms that could be used with the present invention to provide the auto-tune of the RF power for close-to-optimum required field strength for communication.

Referring to FIG. 2, there is shown a flow diagram 100 illustrating the operational steps performed by a radio in accordance with the present invention. After initially transmitting at full power (102), the first radio user would dekey or otherwise release the PTT switch, which would preferably cause the first radio to transmit a trailing ID (104). The first radio would continue to transmit for a predetermined duration with a gradually decreasing RF power signal (106). As previously discussed, the signal must be fixed, but does not need to be linear. For example, it could be a step-down function. A second radio monitors (108) for the first radio's trailing ID and for its gradually decreasing RF power signal. If the second radio detects that the RF signal level from the first radio drops to a minimum required level for reliable radio communication (110), then the second radio transmits an acknowledgment or reply message (112) containing power level information to the first radio. Otherwise, second radio should continue to monitor for the first radio's trailing ID and RF signal level. Based on the second radio's acknowledgment (114), the first radio would adjust its subsequent transmitter power level. Optionally, the second radio could adjust its signal power to the first radio.

Figure 3:
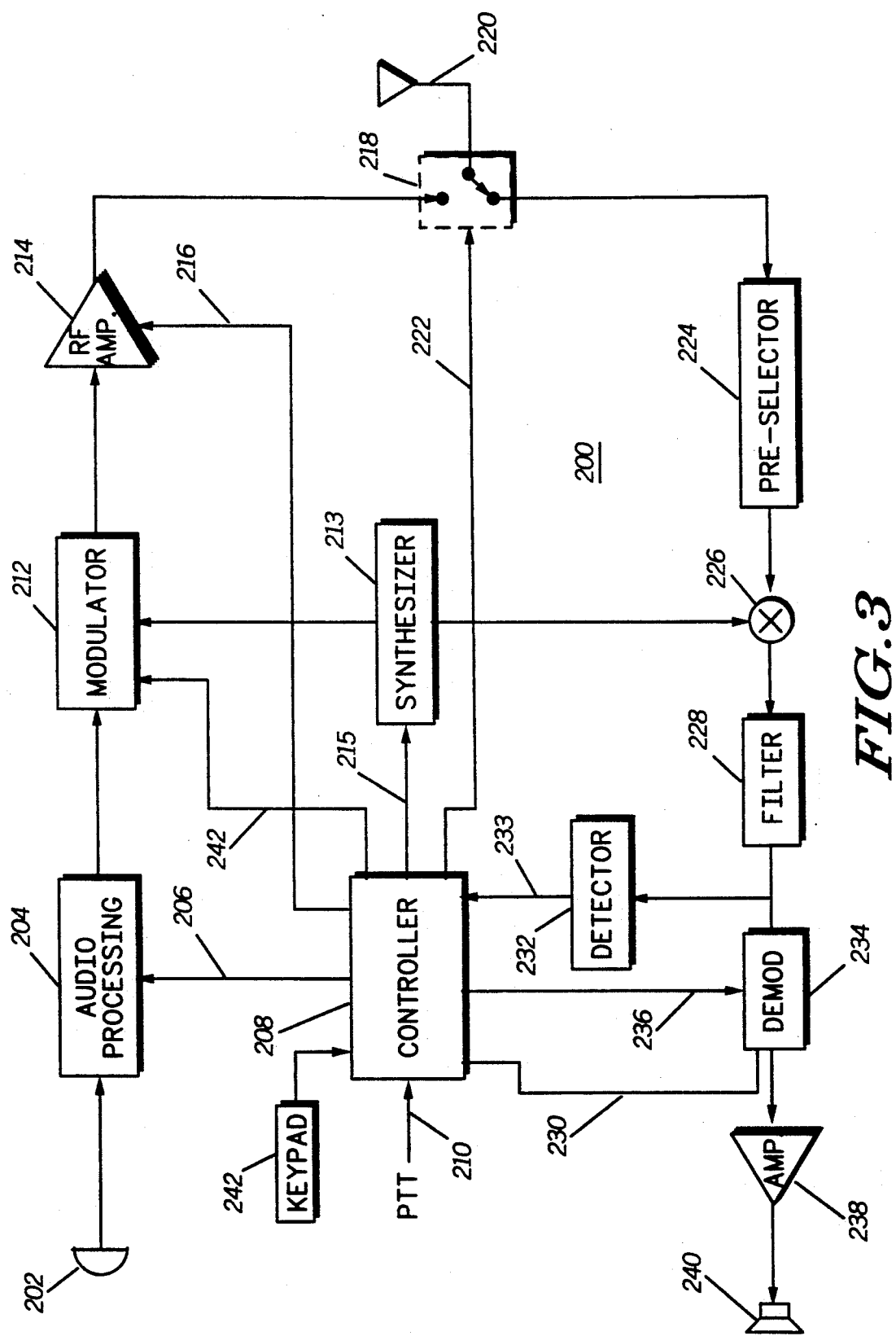
FIG. 3 is a block diagram of a subscriber unit in accordance with the present invention.

Referring to FIG. 3, a block diagram of a subscriber unit 200 in accordance with present invention is shown. Audio energy impressed upon a microphone 202 is received and processed by an audio processing portion 204, which is activated (206) by the controller 208. The controller 208 comprises the heart of the subscriber unit 200 and will activate the audio processing portion 204 in response to the dekeying of a push-to-talk (PTT) switch input 210. The controller (208) would provide at least a portion of the means for transmitting a first message having a decreasing power level signal. The controller (208) would act as a signal processor that would carry out the algorithm in accordance with the present invention. The processed audio is forwarded to a modulator 212, which accepts as a second input the output of a synthesizer 213 (optionally, the synthesizer 213 could be directly modulated as is known in the art). The synthesizer is programmed (215) by the controller 208 to the desired transmission frequency. The modulated signal is applied to a radio frequency (RF) power amplifier 214, which has a power level control line 216 to adjust the transmitter power in accordance with the commands of the controller 208 (typically, the RF power amplifier 214 may include an automatic level control circuit). The amplified signal is routed to an antenna 220 via an antenna switch 218, which is controlled (222) by the controller 208.

When receiving, the antenna 220 is coupled to a preselector 224 via the antenna switch 218. The preselector 224 comprises a filter, which band-limits the frequency spectrum to a band of interest for the receiver. The filtered output of the preselector 224 is routed to a mixer 226, which accepts as a second input the signal from the synthesizer 213 to down convert the received signal. The output of the mixer 226 is coupled to a filter 228, which further band-limits the signal to a suitable intermediate frequency (IF) as is known in the art. After filtering, the received information is routed to a 234. When activated (236) by the controller 208, the demodulator supplies data (such as signal strength information) to the controller 208 (via the data line 230), while audio information is routed to an audio amplifier 238 and provided to a speaker 240 to be broadcast to the operator.

Additionally, the subscriber unit 200 includes the detector 232, which measures the received signal strength at the output of the filter 228. The signal strength information is routed to the controller 208 via the signal strength line 233. In this way, the controller 208 can return the signal strength information to another subscriber unit by routing (242) the signal strength information to the modulator 212 for transmission.

Any signal strength information received (230) by the controller 208 is processed to determine whether to increase or decrease the power of the subscriber by adjusting (216) the RF power amplifier 214. In another aspect of the present invention, the automatic operation of the power control system can be defeated via a key pad 242, which will program the controller 208 to disregard the signal strength information received on the data line 230. Additionally, a base station could transmit a command code disabling the automatic power reduction provided by the present invention. In this way, an operator supervising the base station would be able to receive all subscriber communications as they would be transmitted at full power.

What is claimed is:

1. A method for adjusting the power of a transmitter during a subscriber call, comprising the steps of:
   at a first subscriber unit:
   (a) transmitting a decreasing RF power signal starting at a given maximum level for a predetermined duration;
   (b) receiving a second subscriber unit's acknowledgment;
   at the second subscriber unit:
   (a) monitoring the first subscriber unit's RF power signal;
   (b) determining when the first subscriber unit's RF power signal level drops to a minimum required level for reliable communication;
   (c) transmitting an acknowledgment to the first subscriber unit.

2. The method for adjusting the power of a transmitter during a subscriber call of claim 1, wherein said decreasing RF power signal is a fixed linear signal.

3. The method for adjusting the power of a transmitter during a subscriber call of claim 1, wherein said decreasing RF power signal is a fixed non-linear signal.

4. The method for adjusting the power of a transmitter during a subscriber call of claim 1, wherein said second subscriber unit's acknowledgment to the first subscriber comprises information calculating the minimum required level based on the time between the maximum level and the point where the first subscriber unit's RF signal drops below an unacceptable level for transmission.

5. The method for adjusting the power of a transmitter during a subscriber call of claim 1, wherein said second subscriber unit's acknowledgment to the first subscriber comprises information calculating the minimum required level based on the maximum level of the first subscriber unit's RF signal and the slope of the first subscriber unit's RF signal.

6. The method for adjusting the power of a transmitter during a subscriber call of claim 1, wherein the method comprises, at the first subscriber unit, the further step of: (c) adjusting the RF power signal in accordance with the second subscriber unit's acknowledgment.

7. The method for adjusting the power of a transmitter during a subscriber call of claim 1, wherein the method comprises, at the second subscriber unit, the further step of: (d) adjusting the RF power signal in accordance with the second subscriber unit's acknowledgment.

8. The method for adjusting the power of a transmitter during a subscriber call of claim 1, wherein the first subscriber unit transmits a trailing identification code before step (a).

9. A method for adjusting the power of a transmitter during a subscriber call, comprising the steps of:

at a first subscriber unit:
(a) transmitting a first message at a first power level that decreases to a second minimum required power level within a predetermined duration to a second subscriber unit;
(b) receiving a reply message from said second subscriber unit, said reply message including a code representing a desired transmitting signal strength of the first subscriber unit as determined by said second subscriber unit;
(c) determining a value representing the desired transmitting signal strength of the first subscriber unit of said reply message;
(d) adjusting the power level based on the value representing the desired transmitting signal strength;
(e) transmitting a second message at the desired transmitting signal strength to said second subscriber;

at said second subscriber unit:
(a) receiving said first message from said first subscriber unit;
(b) determining a code representing the desired transmitting signal strength of the first subscriber unit;
(c) transmitting said reply message to said first subscriber unit, said reply message including the desired transmitting signal strength of the first subscriber unit; and,
(d) receiving said second message from said first subscriber unit.

10. The method for adjusting the power of a transmitter during a subscriber call of claim 9, wherein said first message is a fixed linear signal.

11. The method for adjusting the power of a transmitter during a subscriber call of claim 9, wherein said first message is a fixed non-linear signal.

12. The method for adjusting the power of a transmitter during a subscriber call of claim 9, wherein said second subscriber unit's reply to the first subscriber comprises information calculating the minimum required level based on the time between the maximum level and the point where the first subscriber unit's RF signal drops below an unacceptable level for transmission.

13. The method for adjusting the power of a transmitter during a subscriber call of claim 9, wherein said second subscriber unit's reply to the first subscriber comprises information calculating the minimum required level based on the maximum level of the first subscriber unit's RF signal and the slope of the first subscriber unit's RF signal.

14. The method for adjusting the power of a transmitter during a subscriber call of claim 9, wherein the first subscriber unit transmits a trailing identification code before step (a).

15. A subscriber unit capable of adjusting transmitter power during a subscriber call, comprising:
means for transmitting a first message at a first power level that decreases to a second minimum required power level within a predetermined duration to a second subscriber unit;
means for receiving a reply message from said second subscriber unit, said reply message including a code representing a desired transmitting signal strength of the first subscriber unit as determined by said second subscriber unit;
means for determining a value representing the desired transmitting signal strength of the first subscriber unit of said reply message;
means for adjusting the power level based on the value representing the desired transmitting signal strength;
means for transmitting a second message at the desired transmitting signal strength to said second subscriber.

16. The subscriber unit of claim 15, wherein said first message is a fixed linear signal.

17. The subscriber unit of claim 15, wherein said first message is a fixed non-linear signal.

18. The subscriber unit of claim 15, wherein said second subscriber unit's reply message to the first subscriber comprises information calculating the minimum required level based on the time between the maximum level and the point where the first subscriber unit's RF signal drops below an unacceptable level for transmission.

19. The subscriber unit of claim 15, wherein said second subscriber unit's reply to the first subscriber comprises information calculating the minimum required level based on the maximum level of the first subscriber unit's RF signal and the slope of the first subscriber unit's RF signal.

20. The subscriber unit of claim 15, wherein the means for transmitting a first message includes the transmission of a trailing identification code.

* * * * *